US006819506B1

(12) United States Patent
Taylor et al.

(10) Patent No.: US 6,819,506 B1
(45) Date of Patent: Nov. 16, 2004

(54) OPTICAL LENS SYSTEM FOR PROJECTING LIGHT IN A LAMBERTION PATTERN FROM A HIGH POWER LED LIGHT SOURCE

(75) Inventors: Wilfrid E. Taylor, Surrey (CA); Wilfrid L. Taylor, Langley (CA); James R. Taylor, Langley (CA); David W. Kappel, Santee, CA (US); Paul Nam-Kwan Wu, Richmond (CA)

(73) Assignee: Infinity Trading Co. Ltd., Langley (CA)

( * ) Notice: Subject to any disclaimer, the term of this patent is extended or adjusted under 35 U.S.C. 154(b) by 0 days.

(21) Appl. No.: 10/673,279

(22) Filed: Sep. 30, 2003

(51) Int. Cl.[7] .............................. G02B 17/00; F21V 5/00
(52) U.S. Cl. ....................... 359/726; 359/708; 359/712; 362/327; 362/329
(58) Field of Search ................................ 359/726, 718, 359/708, 712; 362/800, 327, 329, 294, 157, 711

(56) References Cited

U.S. PATENT DOCUMENTS

| 2,215,900 A | 9/1940 | Bitner | 362/309 |
|---|---|---|---|
| 2,254,961 A | 9/1941 | Harris | 362/327 |
| 2,254,962 A | 9/1941 | Harris | 362/327 |
| 2,469,080 A | 5/1949 | Rosin et al. | 362/327 |
| 2,908,197 A | 10/1959 | Wells et al. | 359/718 |
| 4,466,050 A | * 8/1984 | Lockard | 362/307 |
| 5,485,317 A | 1/1996 | Perissinotto et al. | 359/712 |
| 5,757,557 A | 5/1998 | Medvedev et al. | 359/70 |
| 5,813,743 A | * 9/1998 | Naka | 362/16 |
| 6,274,924 B1 | 8/2001 | Carey et al. | 257/676 |
| 6,527,419 B1 | 3/2003 | Galli | 362/308 |
| 6,547,423 B2 | 4/2003 | Marshall et al. | 362/333 |
| 6,560,038 B1 | 5/2003 | Parkyn, Jr. et al. | 359/726 |

FOREIGN PATENT DOCUMENTS

DE 19739400 A1 11/1999

* cited by examiner

*Primary Examiner*—Georgia Epps
*Assistant Examiner*—M. Hasan
(74) *Attorney, Agent, or Firm*—Dowell & Dowell, P.C.

(57) ABSTRACT

An optical lens having a body with a front face and a rear cavity for cooperatively receiving and optically aligning a high power light emitting diode source with respect to a primary central optical axis of the lens. Reflective inner side walls of the body project light in a lambertion pattern from the front face at an angle to create a central hot spot. The body includes at least one side flange which is cooperatively received in a guide of a lens holder and further includes a non-optical annular rim extending from the front face for cooperatively seating with the lens holder.

19 Claims, 6 Drawing Sheets

35 mm 70 mm 350 mm 700 mm 35 mm 70 mm 350 mm 700 mm

OPTICAL LENS SYSTEM FOR PROJECTING LIGHT IN A LAMBERTION PATTERN FROM A HIGH POWER LED LIGHT SOURCE

BACKGROUND OF THE INVENTION

1. Field of the Invention

The present invention is directed to lens systems used for flashlights, bicycle or small vehicle lights, hiking lights, search and rescue lights, medical illumination devices, military lighting devices, and other commercial and industrial applications wherein light from a light source is projected through a lens in order to alter characteristics of the projected beam. More particularly, the present invention is directed to an optical lens system which is particularly adapted for use with a high powered light emitting diode (LED) light source having a hemispherical lens associated therewith. The LED source is designed to be cooperatively seated within a cavity in a rear portion of a projecting lens. The projecting lens includes arcuate side walls which are designed to be totally internally reflective to project light through a front face of the lens from the optically aligned LED source such that substantially all light from the LED source passes through the lens body and through the front face of the lens in a lambertion pattern. Preferably, the projected light beam creates a generally central hot spot by directing the light rays at angles between approximately 5° and 30° with respect to a central optical axis of the projecting lens.

The present invention is also directed to lenses which are specifically designed to positively optically aligned and secured when mounted within a lens holder whereby heat dissipation from the LED source is assured so as to maintain LED operating temperatures within critically defined operating ranges.

2. Brief Description of the Related Art

It has been know to use various types of solid lenses to direct light emitted from light sources such that light rays are intensified or altered as they pass through the lenses and are projected forwardly of the lenses. Lens configurations are varied to change the projected light pattern to create different lighting characteristics or different fields of projection.

By way of example, in U.S. Pat. No. 2,469,080 to Rosin et al., a unitary lens is disclosed having a projection face and a rear wall having a central cavity extending therein for purposes of providing a chamber for seating a light source. Light from the source is projected laterally and forwardly through the lens and the lateral light is projected or reflected off the inner surfaces of the lens and through the front face of the lens in a collimated pattern wherein the light rays are substantially parallel to one another. With such a lens, the size of the light beam remains generally constant and is generally uniform in intensity across the full width of the beam such that a spot reflected off a surface close to the lens will appear to have approximately the same size as one reflected off a surface which is much farther from the lens.

In U.S. Pat. No. 2,908,197 to Wells et al., a lens for creating a wide angle distribution of light received from a light source is disclosed. In the lens system described, the front face of the lens is altered to create a different light projection pattern. The lens includes a rear cavity in which a light source is seated such that light is projected forwardly and laterally within the lens with the lateral light being reflected from the side walls of the lens forwardly through the various portions of the front face described and shown in the patent. In this manner, different wide angle light patterns are obtained from the light source.

In many instances, lenses are specifically designed for different types of light sources. By way of example, in U.S. Pat. No. 5,757,557 to Medvedev et al., a beam forming lens is disclosed particularly for use with an incandescent light source such as a conventional incandescent bulb. As with other prior art lenses, the lens body includes a front face, tapering side walls and a rear cavity. The cavity is of a size within which the incandescent light source is cooperatively received. Light from the light source is projected substantially 360° with respect to the incandescent bulb and is reflected by the inner side walls of the lens forwardly through the front face. As taught in the patent, it is desired that the lens reflect as much energy from the incandescent light source as is possible so that light normally projected rearwardly of the incandescent bulb is projected forwardly in a collimated or parallel beam or pattern from the front face of the lens.

In U.S. Pat. No. 6,547,423 to Marshall et al., an LED optical device is disclosed which is particularly designed to use with light emitting diode (LED) modules for purposes of improving the efficiency and performance of the light being projected from the LED source. The lenses disclosed include both generally planar and shaped outer front faces with each lens including tapered side walls. Each lens further includes a cavity which defines a refractive inner side wall and a refractive end wall or lens in which the LED source is seated. Light from the LED source is projected both forwardly and laterally and the lateral light energy is reflected from the inner reflective walls of the lens such that light projected from the front face of the lens is collimated. In some embodiments, the angle of the light may be modified, however, light rays from the lens remain generally parallel.

Other prior references of interest include U.S. Pat. No. 2,215,900 to Bitner et al., U.S. Pat. No. 2,254,961 to Harris, U.S. Pat. No. 5,813,743 to Maka, U.S. Pat. No. 5,485,317 to Perissinotto et al., U.S. Pat. No. 6,527,419 to Galli and U.S. Pat. No. 6,560,038 to Parkyn, Jr. et al.

From the foregoing, the configuration and elements of a lens system for collecting and projecting light from a source is dependent on features of the source. Thus, lenses that may work well with incandescent light sources will not function for other types of lights such as LED light sources due to different focal as well as other physical characteristics of the differing light sources.

New higher power light emitting diodes are being developed. Examples of such newer high powered LEDs are described in U.S. Pat. No. 6,274,924 to Carey et al., the contents of which are incorporated herein in its entirety by reference. Commercially, high powered LEDs are marketed under the names LUXEON I Emitter, LUXEON III Emitter, LUXEON Star and LUXEON V Star.

The new configuration or physical package of the high power LEDs differs from conventional LEDs and also creates additional problems due to the significant amount of heat developed by the high power LEDs.

The thermal requirements for the new high power LEDs is critical. A junction temperature for such high powered LEDs cannot exceed approximately 120° Celsius. High power LEDs can shift to slightly higher wave lengths with a rise in the junction temperature. The human eye is sensitive to color shift and this must also be accounted for in a design of a projection system.

Further, high power LEDs experience a loss of light output as their junction temperature increases. Therefore, the lower the junction temperature maintained, the better the luminous efficiency of the light source. By way of example, if there is exactly enough heat dissipation at an ambient temperature of 10° Celsius with respect to the junction temperature, as the temperature rises, the light from the LED will begin to dim.

High power LEDs also become more unreliable when the junction temperatures exceed the maximum designed. The maximum junction temperatures are based upon the allowable thermal stress of encapsulates which surround components of the LEDs, such as silicone. Further, LEDs may have a reduced life expectancy due to temperatures exceeding maximum design temperatures. Newer high power LEDs may have a life expectancy of 100,000 hours while still maintaining 70% of their original efficiencies. However, if temperatures rise above the maximum junction temperature, the high power LEDs will drop to 70% of their original efficiency immediately without regard to number of hours of operation.

Due to the need to maintain temperatures within design limits, new high power LEDs must be utilized with heat sinks to draw heat away from the LED components. If a heat sink is disengaged for only a period of a few minutes, an LED may become permanently damaged or destroyed.

In view of the foregoing, there is a need to design a new lens system for use with high power LED light sources wherein lenses associated with the system not only provide for a maximum reflectance of light energy received from the LED sources but also wherein the lenses are designed to be cooperatively used with holders so as to insure an integrity of heat sinks for maintaining safe operating temperatures of the LEDs during use.

SUMMARY OF THE INVENTION

The present invention is directed to a lens system for use with new high power LED light source packages and is specifically designed to project a non-collimated beam of light energy. More particularly, the invention is directed to creating a lambertion projection of light that is free of light distortions and wherein in the overall beam angle is between 5° and 30° degrees.

The lens system incorporates a solid lens body having a front projecting face which is surrounded by an annular non-optical lip for purposes of providing stability when the lens is mounted within an optical holder. The body of the lens includes a conically tapering sidewall which extends from the front face convexly rearwardly to a rear face such that the side wall is symmetrical with respect to an optical center line or central axis of the lens body extending from the rear face to the front face of the lens. A cavity is formed in the rear face of the lens of a size to cooperatively receive a hemispherical dome or lens cover associated with a high power LED source. The cavity is defined by a cylindrical refractive side wall which is axially aligned with the central axis of the lens and an inner refractive lens wall which may be either planar or convex. To assure proper alignment of the LED source with the projecting lens, a counterbore is provided in the rear face of the lens in which the LED body is mounted. Such mounting will insure the LED cover which seats in the cavity of the projecting lens is perfectly aligned with the optical axis of the lens when the LED is mounted thereto.

Light from the LED passes from the cavity into the body of the lens and is reflected from the inner sidewall of the lens so as to be non-collimating as it passes forwardly of the lens. In preferred embodiments, the lens configuration defines a central hot spot of greater light intensity. Further, light is projected in a lambertion pattern with the overall beam angle being between 5° and 30° relative to the central axis of the lens.

To provide an accurate alignment of the lens relative to a lens or optic holder, the present invention also provides at least one guide flange which is integrally formed with the lens and which preferably extends radially outward adjacent the rim or lip surrounding the front face of the lens. In some embodiments, a plurality of such guide flanges may be used to appropriately align the lens within a lens holder.

The lens holder of the present invention is designed to insure proper heat dissipation from the LED source such that premature destruction and loss of longevity of the LED light source is effectively prevented.

The lens holder includes a somewhat cylindrical shell which is open at its forward end and substantially closed at its rear or opposite end. Mounted within the holder are one or a plurality of spaced rails which define channels for cooperatively receiving the guide flange or flanges associated with the lens body. In this manner, when the lens is inserted within the holder, the guide flange or flanges will insure accurate placement and retention of the lens within the holder and will also insure that the lens is properly seated with respect to a hemispherical cover of the high powered LED source which is mounted within the optic holder.

The LED source is mounted to heat sink members carried by the holder. One heat sink member includes a base from which a plurality of spaced finger elements extend along the inner surface of the lens holder surrounding the lens. A second heat sink member is mounted in contact with the first heat sink member but is housed in a pocket within the lens holder. The first and second heat sink members are formed of metal and are adhesively connected to conduct heat from the LED source. A metallic heat dissipating tap, such as a screw, engages the second heat sink member and extends therefrom through the body of the lens holder to thereby dissipate heat from the holder. The heat sinks and tap member will effectively dissipate heat from the LED source to maintain operating temperatures of the high powered LED within specific ranges.

As described, to maintain the LED in contact with respect to the heat sinks, the LED is secured to one of the heat sinks by a special high temperature adhesive. Due to the nature of the adhesive, it is critical that no force be placed laterally to create a shearing moment between the LED light source and the heat sinks or premature failure of the LED may occur due to heat buildup caused by an inefficient contact between the LED source and the heat sinks during operation of a lighting unit incorporating the lens system. The relationship between the lens guide flanges and the guide channels of the lens holder prevent such a shearing force.

The optical holder further includes an electrical circuit board for providing power to the LED source and an on/off switch mechanism for supplying power to the circuit board from a conductor connected to a source of power such as a battery. The optical holder is designed to be further enclosed within an outer housing depending upon the ultimate end use of the optical system.

The annular rim or lip which surrounds the front face of the lens body is specifically designed to insure that the lens is properly optically aligned relative to the LED source when placed within the optic holder. The rim or lip is designed to be compression fitted within the optic holder by an outer fitting which is sealed against the annular rim by way of a gasket, O-ring or similar element.

It is the primary object of the present invention to provide a lens system which may be utilized to project light from a high power LED source wherein the lens system is designed to project a non-collimated beam of energy in a lambertion pattern at an angle of 5° and 30° degrees with respect to a primary axis of the lens body and wherein a hot or intense area of light is developed generally centrally of the projected light beam whereby the appearance of the beam will vary depending on a distance from which the beam is viewed relative to the front face of the projection lens.

It is another object of the present invention to provide a lens system for projecting light from a high power LED light source wherein the lens is structured to provide both an alignment flange as well as a mounting rim or lip to insure proper alignment of the lens with an LED light source carried within a lens holder such that the lens is mounted within the holder without effecting the optical properties of the surfaces of the lens and wherein the LED light source is seated within a cavity and counterbore within the rear of the lens and retained therein without any shearing action being created between the lens and the LED which would tend to interrupt an effective contact between the LED and heat sinks provided within the lens holder.

It is also an object of the present invention to provide a lens for use with high power LEDs wherein the lens and the LED source are mounted within a holder which is provided with effective heat sinks to maintain the temperature of the high power LED within specified operating temperatures thereby maximizing the life span and the efficiency of the LED light source.

BRIEF DESCRIPTION OF THE DRAWINGS

A better understanding of the invention will be had with reference to the accompanying drawings wherein.

DESCRIPTION OF THE PREFERRED EMBODIMENTS

Figure 2:
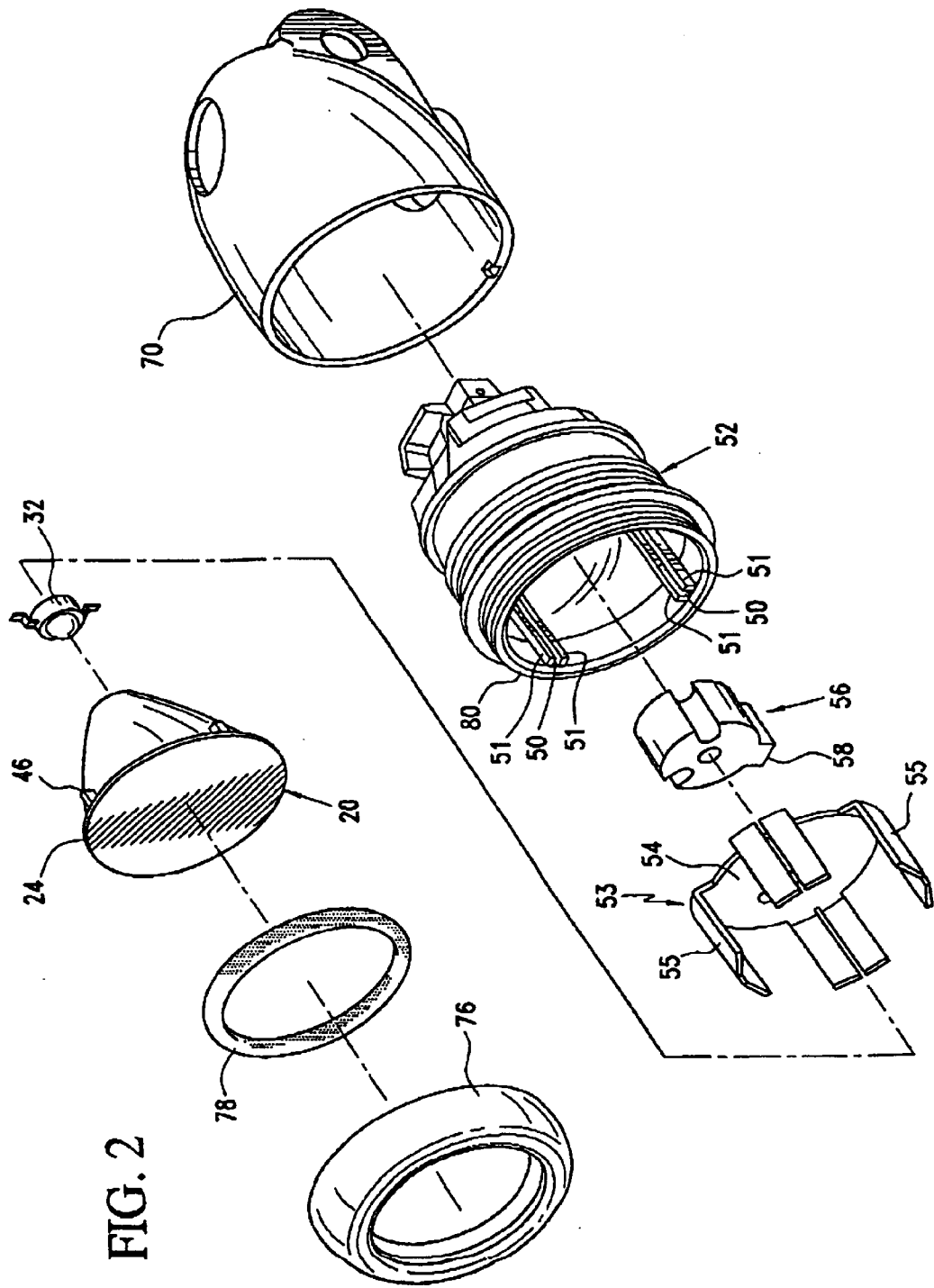
FIG. 2 is an assembly view of the light assembly of FIG. 1.

With continued reference to the drawing figures, two embodiments of the invention are described. In each embodiment, a lens is shown for purposes of projecting light from a high power light emitting diode (LED) source such as one disclosed in U.S. Pat. No. 6,274,924 to Carey et al., the contents of which are incorporated herein, in their entirety, by reference. Each lens is designed to direct the light from the LED source forwardly of a lens housing so as to create a non-collimating beam which is preferably in a lambertion pattern such that an overall beam angle is maintained between 5 and 30 degrees with respect to a longitudinal axis of the lens in order to create a brighter or hotter spot at greater distances from the lens when light is projected therethrough. The overall configuration of each lens is generally as shown in FIG. 2 which is an assembly view wherein one of the lenses is mounted within an optic holder that is designed to be mounted within an outer housing depending upon the end use of the lens system.

Figure 3:
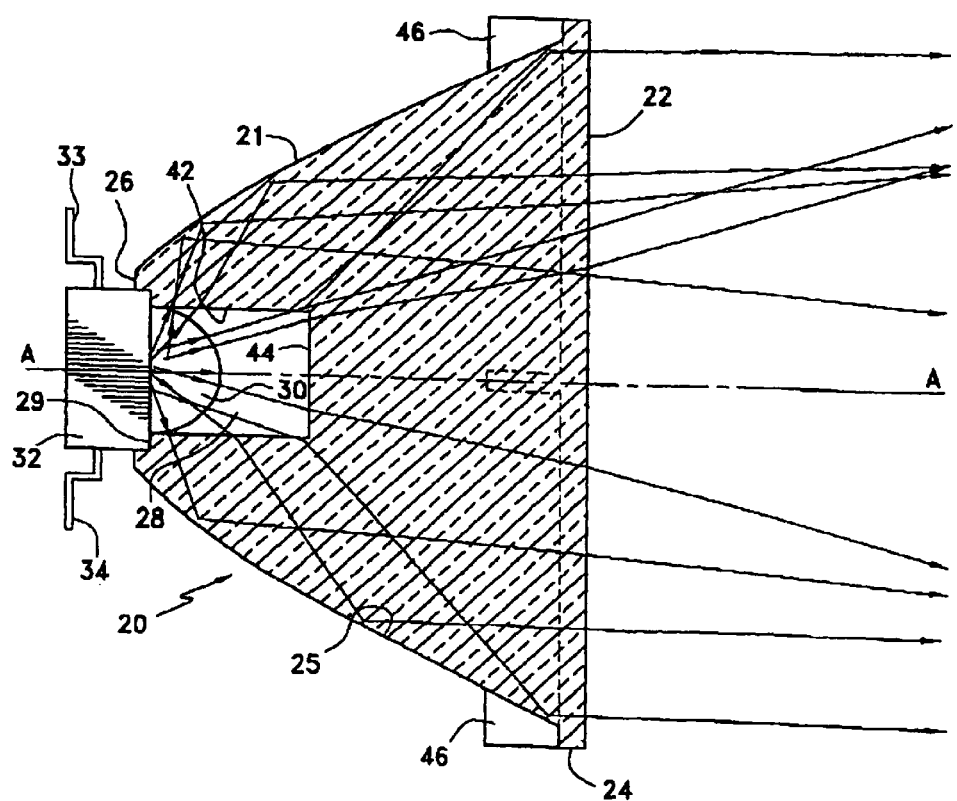
FIG. 3 is a cross-sectional view taken through a first preferred lens in accordance with the present invention showing the light pattern projected from a high power LED source.

With specific reference to FIG. 3, a cross-sectional view of a first embodiment of lens in accordance with the present invention is shown in detail. The lens 20 includes a generally solid body 21 having a front generally planar face 22 which is surrounded by an annular non-optical bead, rim or lip 24. The body includes a total internal reflection (TIR) inner side wall 25 in a general conical configuration. The outer side wall has a convex sloping surface from the front face 22 to a rear face 26 of the body. The rear face of the body includes a central cavity 28 of a configuration to cooperatively receive a cover or lens element 30 which is generally hemispherical in shape and from which light from a LED source 32 is directed. The LED 32 is a high power LED as disclosed in the aforementioned patent including electrical leads 33 and 34 which are designed to be connected to an electrical circuit board 35, see FIG. 1, which receives power from a conductor 36. the conductor 36 extends from a source of power such as a D.C. battery 38 by way of an on/off switch 40.

In the present embodiment, the cavity 28 is formed with a generally cylindrical refractive side wall 42 having a central axis which is aligned with a central elongated optical axis A—A of the lens 20. Further, the cavity is defined by an inner wall or lens surface which, in the present embodiment, is shown as a planar or flat wall 44.

As shown in FIG. 3, the light from the LED hemispherical lens 30 passes outwardly through the body 21 of the lens 20 and is redirected at varying angles as is shown by the arrows in the drawing figure.

As previously described, the projection of light is in a lambertion pattern and is free of light distortions. The resultant light beam creates a center portion receiving approximately 72% of the light being projected from the high power LED source.

The amount of light captured by the lens 20 depends upon the actual dimensions of the reflecting surface or TIR surface of the lens. For a maximum front or projecting face diameter of approximately 30.00 mm, approximately 92% of the light will be captured from the LED source whereas if the surface is increased to 32.80 mm, approximately 5% more light from the light source will be captured and reflected. Likewise, by reducing the diameter of the projecting face from 30.00 mm to 27.00 mm, the lens will output approximately 10% less total light from the high power LED.

With specific reference to FIGS. 5A, 5B, 5C and 5D, configurations of light beams projected through the lens 20 are shown at distances of 35 mm, 70 mm, 350 mm and 700 mm. It can be seen how the density of the central area increases and varies from a close proximity to the lens to a distance spaced from the lens.

The lens 20 also includes at least one and preferably a plurality of guide flanges 46 which are preferably integrally formed therewith and which extend radially outwardly from the body 21 adjacent to the annular rim or lip 24. Four such flanges 46 are shown in the embodiment of FIG. 3 with three being viewable in the drawing figure. The flanges 46 are designed to cooperate with guide channels 50 defined between pairs of guide rails 51 which are provided within a somewhat cylindrical optical holder 52. The structure and special purpose of the optical holder 52 will be described in greater detail hereinafter.

Figure 4:
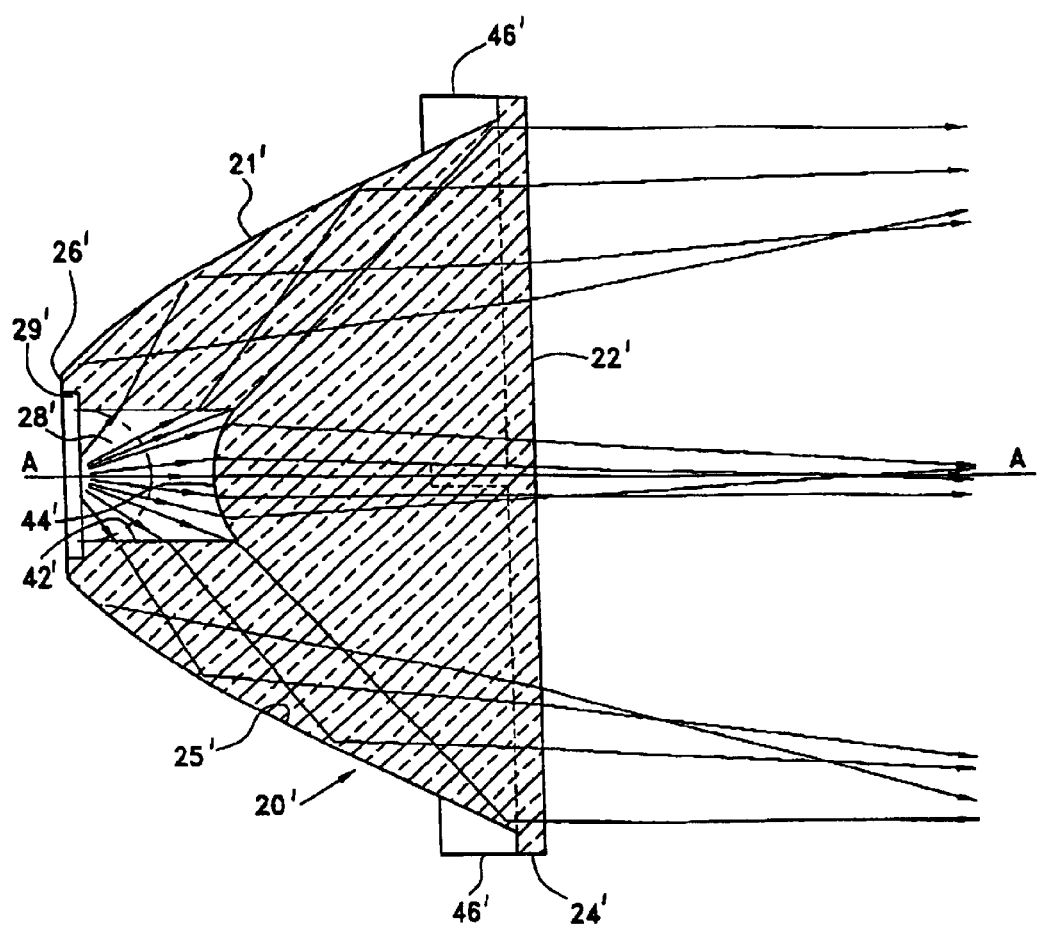
FIG. 4 is a cross-sectional view of a second preferred embodiment of lens showing the light pattern projected from a high power LED source.
Figure 5A:
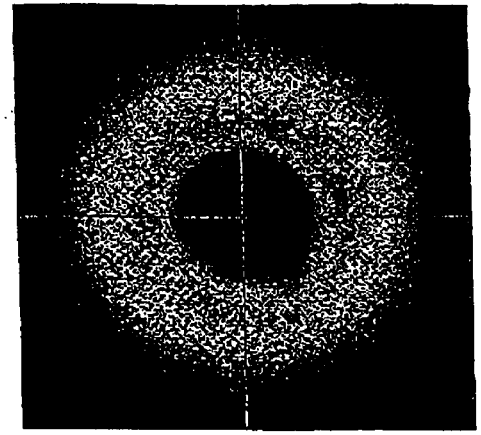
FIGS. 5A through 5D show light patterns created by the lens of FIG. 3 at distances between 35 mm and 700 mm.
Figure 5B:
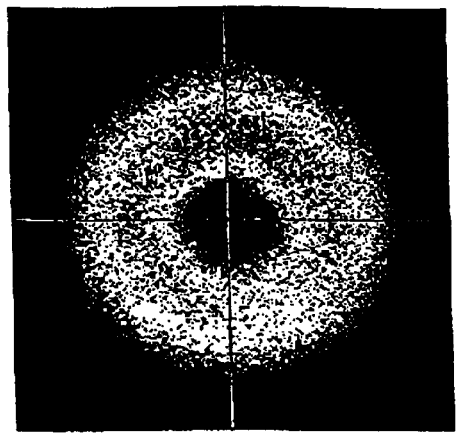
Figure 5C:
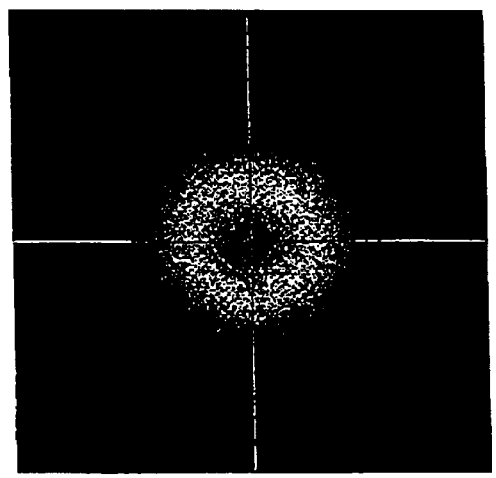
Figure 5D:
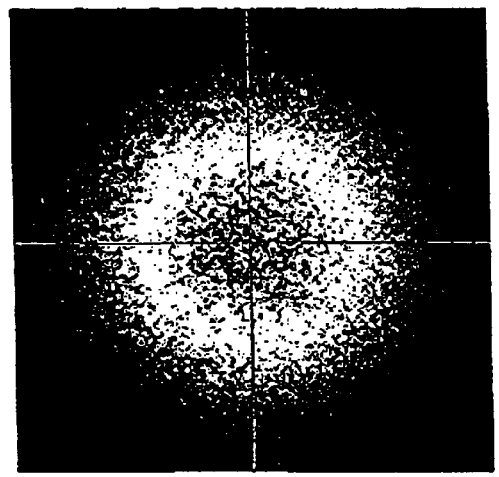
Figure 6A:
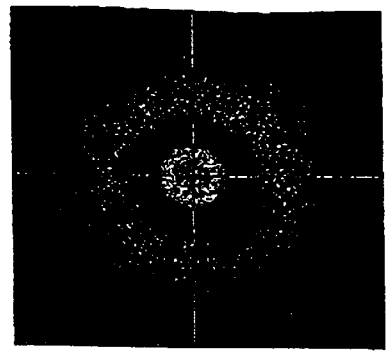
FIGS. 6A through 6D show the beam patterns projected by the lens of FIG. 4 at distances between 35 mm and 700 mm.
Figure 6B:
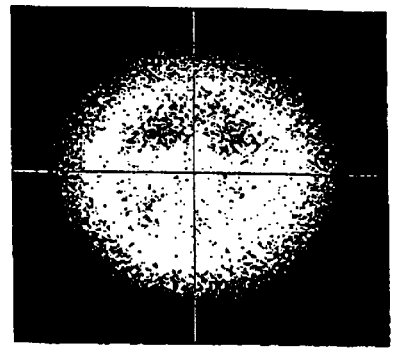
Figure 6C:
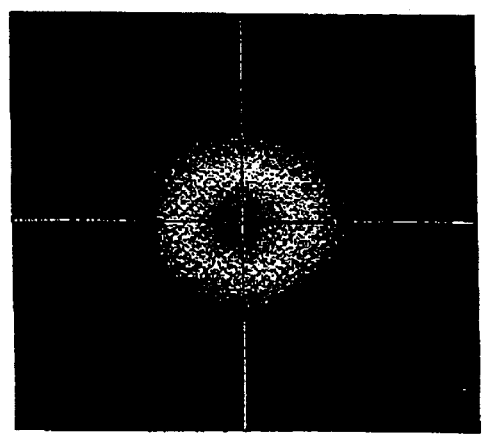
Figure 6D:
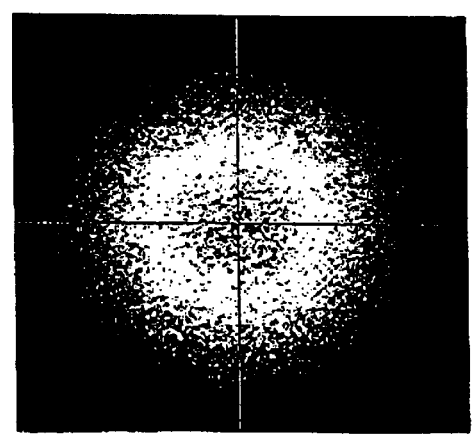

With particular reference to FIG. 4, a second embodiment of lens 20' is disclosed which may be used in accordance with the teachings of the present invention. The lens is similar to the one previously described with the exception of the shape of the cavity 28' in which the LED dome 30 of the LED source 32 is received. The lens includes a front or projecting face 22' surrounded by integrally formed but non-optic annular rim or lip 24'. A plurality of guide flanges 46' are provided for purposes of aligning the lens when mounted within the optic holder 52.

The lens further includes a body 21' which is generally conical with a sloping convex outer sidewall which extends inwardly toward an inner face 26' thereof. The lens further includes a fully reflective inner surface 25' by way of which light from the LED is projected forwardly through the projection face 22' of the lens.

In the present embodiment, as opposed to a planar lens or inner wall for the cavity in which the LED lens is received, the front face of the cavity is formed as a convex lens 44' which tends to concentrate more of the light energy to a central hot spot forwardly of the lens when light is projected therefrom. As with the previous embodiment, the cavity 28' is axially aligned about the central axis A—A of the lens.

By altering the inner surface configuration of the cavity in which the LED source is seated from a planar configuration to a convex configuration, a greater percentage of light is projected to a hot center spot such that approximately 84% of the light being projected is more concentrated toward a central portion of the projected light beam.

With specific reference to FIGS. 6A, 6B, 6C & 6D, there are shown the light beam patterns emitted from the lens 20' at distances of 35 mm, 70 mm, 350 mm and 700 mm. It should be noted that the center spot remains generally brighter at each distance when compared to the embodiment shown in FIGS. 3 and 5.

Figure 1:
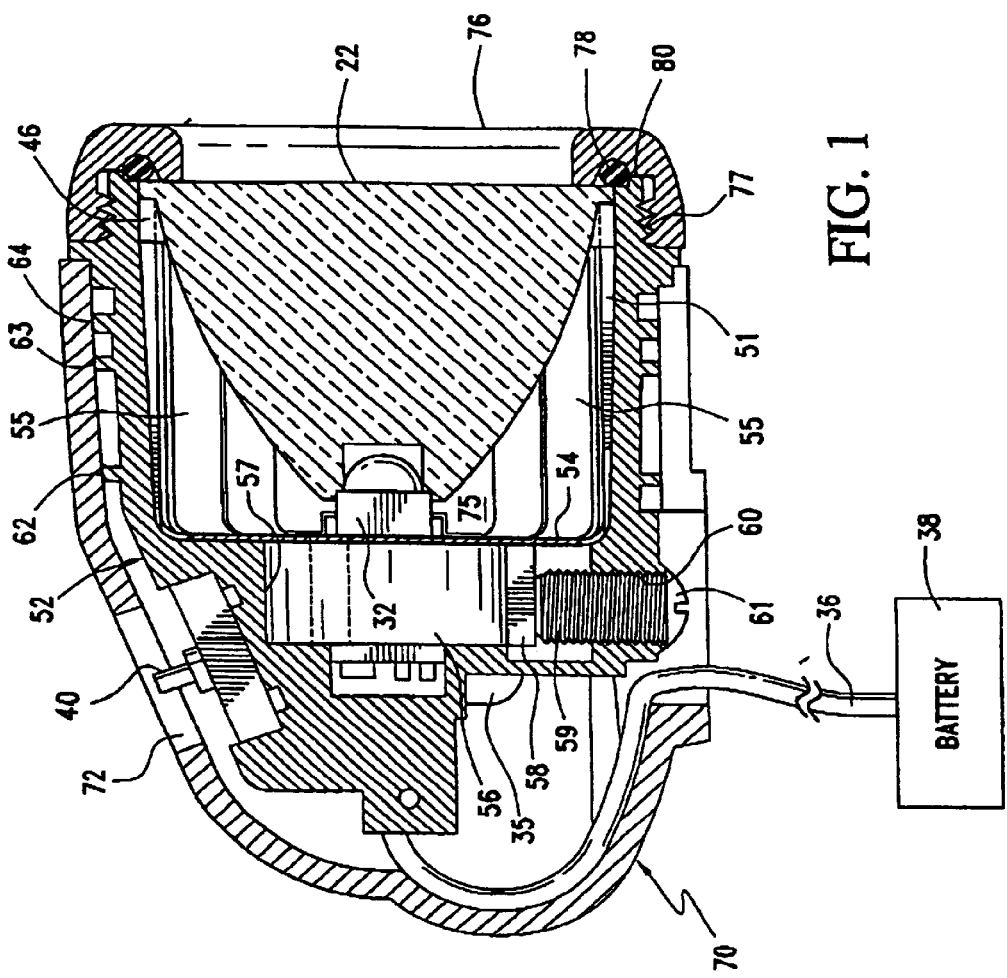
FIG. 1 is a cross-sectional view of a light assembly incorporating the lens system of the present invention.

As previously described, the lenses 20 and 20' are specifically designed for use with currently available high power LEDs which have a substantially hemispherical lens as shown at 30 in FIG. 3. It is important that the LED lens be properly aligned within the cavities 28 and 28' to insure maximum efficiency of light output through the lenses. To insure proper alignment along the x, y and z axes, the present invention incorporates a counterbore 29 and 29', see FIGS. 2 and 3 respectively, in the rear surface of the lenses 20 and 20'. The counterbores 29, 29' are of a size to cooperatively seat the body of the high power LED 32 therein, as is shown in FIGS. 1 and 2.

A proper focal length between the LED light source and the end lens wall 44,44' must be maintained to obtain maximum efficiency for directed light output. In this respect, the depth of the counterbore 29 from the rear face 26 of the lens 20 is approximately 0.50 mm and the distance between the rear face 26 and planar wall 44 of the cavity 28 is approximately 8.20 mm. For the lens 20', the depth of the counterbore 29' from the rear face 26' is approximately 0.50 mm and the distance from the rear face to the convex wall 44' of the cavity 28' is approximately 7.50 mm.

The depth of the 0.5 mm counterbore is critical to the respective beam angle desired. An example of setting an exact beam angle is the 0.5 mm counterbore and the associated measurements to the inner convex surface and the inner Plano surface. However, this does not restrict or limit the invention. The depth of the counterbore can be varied greater or less than the 0.5 mm depth in order to provide wider or narrower beam angles as discussed herein.

The invention also uses a particularly designed optic holder 52 which cooperates with the physical structure of the lenses 20 and 20' to insure proper alignment each time the lenses are inserted within the optic holder. The optic holder is specifically designed to function as a heat sink so as to insure that the high power LED operates within specified temperature ranges to further insure maximum illumination output as well as to insure that the LED operates over its designed life expectancy.

As previously noted, the cavities 28 and 28' and counterbores 29 and 29' are axially aligned with the central axis A—A of each lens to insure that, when the LED lens 30 is positioned within the cavity, the LED is in the dead center of the optic lens. A misalignment along any of the x, y or z axes will result in losses in efficiency. For example, a misalignment of 0.10 mm may result in a loss of approximately 4% efficiency while a misalignment of approximately 0.25 mm will result in a loss of 15% efficiency.

The optic holder 52 is generally cylindrical in configuration being closed at its rear end and open at the front end to receive one of the lenses 20 or 20'. A plurality of guide channels 50 are created by spaced rails 51 which are formed within the inner surface of the holder. The channels are cooperatively sized to slidingly receive the flanges 46 and 46' of the lenses to insure that the lenses are maintained in proper alignment with the LED 32 which is adhesively secured to a front surface of a heat sink assembly that is mounted within the holder. The engagement of the flanges within the channels prevents any relative rotation between the lenses and the heat sink assembly.

The heat sink assembly includes a first metallic member 53 having a flat base 54 from which a plurality of spaced fingers 55 extend so as to be positioned along the interior side walls of the holder 52 and intermediate the rails 51 defining the guide channels 50. The heat sink member 53 is preferably formed of a metal such as copper. The body of the high power LED 32 is adhesively secured to the base 54 by use of a silicon rubber based compound.

The base 54 of the first heat sink member is also adhesively secured, such as by use of a silicon rubber based compound, to a more massive second metallic heat sink member 56 which is mounted with a recess 57 within the holder. The heat sink member 56 includes a flat base portion 58 which is engaged by a heat dissipating metallic tap 59. The tap 59 may be in a form of a flat ended screw which extends through a threaded opening or channel 60 in the holder such that a head portion 61 of the tap is in connective heat exchange relationship with air surrounding the holder. The two heat sink members and connection tap dissipate enough heat to allow proper functioning of the high power LED source. The holder further includes a plurality of annular ribs 62, 63 and 64 which serve to retain the holder in spaced relationship with respect to an outer housing or cover 70 to create an air space therebetween.

The configuration of an outer housing or cover will vary depending upon the ultimate end use of the optic system. As previously described, the lens system of the present invention has applications not only for bicycle lighting, hiking lights, research and rescue lights and the like but also has possible uses for medical illumination, military applications, and commercial and industrial applications as well. The housing shown in the drawings is designed more particularly for use as bicycle or hiking lights. An opening 72 is provided through the housing for access to the on/off switch 40 associated with the lens system.

Due to the adhesive mounting of the LED 32 with respect to the heat sink members 53 and 56, it is important to prevent the application of any shearing force between the LED and the heat sink members which could sever the adhesive contact therebetween and thus effect the dissipation of heat from the LED. The channels 50 defined by the spaced rails 51 interact with the flanges 46 and 46' to prevent any relative rotation or movement of the lenses relative to the LED when a lens is positioned against the LED, as shown in FIG. 1, thereby preventing any shearing action which would destroy the adhesive bond between the LED and the heat sink assembly. In effect, the lenses 20 and 20' may only be moved longitudinally into and from a chamber 75 defined within the optic holder 52 as any relative rotational movement is prevented by the flange and rail interaction.

Further, the lenses are retained in place by an annular cap or rim 76 which is threadingly engaged at 77 with cooperating threads on the forward end portion 80 of the holder. An annular gasket or O-ring seal 78 is provided between the rim and the annular lip 24 or 24' of the lenses. Due to the anchored connection of the lens within the optic holder, no rotation of the lenses occurs when the rim 76 is threadingly engaged with the holder to seat the lens relative to the LED light source.

The annular rim or lip 24 or 24' of the lenses 20 and 20', respectively, is important because the rim provides the actual support for maintaining the lenses in alignment with the LED light source. The rim or cap 76, when engaged with the lenses, applies pressure against the non-optic annular rim or lip of the lenses to align the lenses perfectly with respect to the LED light source. With this mounting, no portion of the reflecting surface or optical transmitting surfaces of the lenses are interfered with. Thus, the holder provides maximum light efficiency and transmission during the use of the lens system of the invention.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. An optical lens for projecting light from a high power light emitting diode, the lens including a body having a front face and a rear face and a continuous curved side wall which is symmetrical with respect to a central axis of the body extending between said rear face and said front face, a cavity extending into said rear face of said body coaxially aligned with said central axis of said body for cooperatively receiving a hemispherical cover of a high power light emitting diode source therein so that substantially all light from the high power light emitting diode source enters into said body, and an inner surface of said side walls being reflective and configured such that light from the high power light emitting diode source is projected through said front face in a non-collimated pattern.

2. The optical lens of claim 1 in which said body includes at least one non-optical guide flange extending radially outwardly from said side wall relative to said central axis.

3. The optical lens of claim 2 including a counterbore in said rear face surrounding said cavity for cooperatively seating a portion of the high power light emitting diode therein.

4. The optical lens of claim 3 wherein said body includes an annular lip extending radially outward relative to said front face so as to extend beyond said side wall.

5. The optical lens of claim 4 in which said cavity includes a cylindrical refractive side wall and a planar end wall.

6. The optical lens of claim 5 in combination with a high power light emitting diode light source having a hemispherical lens of a size to be cooperatively received within said cavity.

7. The optical lens of claim 4 in which said cavity includes a refractive cylindrical side wall and a convex end wall.

8. The optical lens of claim 7 in combination with a high power light emitting diode light source having a hemispherical lens of a size to be cooperatively received within said cavity.

9. The optical lens of claim 4 in combination with a lens holder, said lens holder including an annular front portion and a rear portion and defining a central cavity for selectively receiving the optical lens therein, a heat sink assembly mounted within said central cavity, a high power light emitting diode light source mounted in heat conducting relationship to said heat sink, and at least one guide channel formed within said holder for cooperatively receiving said at least one guide flange therein to thereby prevent rotational displacement of said body of said lens relative to said high power light emitting diode when said body is inserted within said central cavity of said lens holder.

10. The optical lens and combination lens holder of claim 9 wherein said annular lip is of a configuration to engage said annular front portion of said lens holder, and a closure member for securing said lip to said annular front portion of said holder to thereby retain said body within said central cavity of said lens holder.

11. The optical lens and combination lens holder of claim 9 wherein said heat sink assembly includes tap means for dissipating heat by convection through a side wall of said lens holder.

12. The optical lens and combination lens holder of claim 9 wherein said heat sink assembly includes a first heat sink member having a base mounted in heat exchange relationship relative to said high power light emitting diode and a plurality of fingers extending within said central cavity and about said lens.

13. The optical lens and combination lens holder of claim 12 in which said heat sink assembly includes a second heat sink member mounted in heat exchange relationship relative to said first heat sink member and said high power light emitting diode, and a tap means extending from said second heat sink member through a side wall of said lens holder.

14. An optical lens for projecting light from a high power light emitting diode, the lens including a body having a front face and a rear face and a continuous curved side wall which is symmetrical with respect to a central axis of said body extending between said rear face and said front face, a cavity extending into said rear face of said body coaxially aligned with said central axis of said body for cooperatively receiving a hemispherical high power light emitting diode source therein so that substantially all light from the high power light emitting diode source enters into said body, an inner surface of said side walls being reflective and configured such that light from the high power light emitting diode source is projected through said front face and said body including at least one non-optical guide flange extending radially outwardly from said side wall relative to said central axis.

15. The optical lens of claim 14 wherein said body includes an annular non-optical lip extending radially outward relative to said front face and said central axis so as to extend transversely beyond said side wall.

16. The optical lens of claim 15 wherein said inner surface of said side walls is of a configuration such that light is projected from said front face of said lens in a non-collimated pattern at a beam angle of between 5° to 30° with respect to said central axis.

17. The optical lens of claim 14 including a counterbore in said rear face surrounding said cavity for cooperatively seating a body of the high power light emitting diode.

18. An optical lens system comprising an optical lens for projecting light from a high power light emitting diode, said lens including a body having a front face and a rear face and a continuous curved side wall which is symmetrical with respect to a central axis of said body extending between said rear face and said front face, a cavity extending into said rear face of said body coaxially aligned with said central axis of said body for cooperatively receiving a hemispherical high power light emitting diode source therein so that substantially all light from the high energy light emitting diode source enters into said body, an inner surface of said side walls being reflective and configured such that light from the high power light emitting diode source is projected through said front face, an annular non-optical lip extending radially outwardly relative to said front face and said central axis of said body so as to extend transversely beyond said side wall, said body further including at least one guide flange extending radially outwardly from said side wall relative to said central axis and oriented rearwardly of said annular lip toward said rear face of said body, a lens holder including a front annular end and a rear portion and defining an internal cavity for cooperatively receiving said body, heat sink means for dissipating heat from the high power light emitting diode mounted within said internal cavity of said lens holder, a high power light emitting diode mounted to said heat sink, at least one guide means within said lens holder for cooperating with said at least one guide flange for preventing rotational movement of said body when said body is within said internal cavity of said lens holder, and a closure member for selectively securing said annular lip of said body to retain said body within said internal cavity of said lens holder.

19. The optical lens system of claim 18 further including an outer housing of a size to receive said lens holder therein.

* * * * *